United States Patent [19]

Maupu et al.

[11] Patent Number: 4,943,772
[45] Date of Patent: Jul. 24, 1990

[54] HALL EFFECT POSITION SENSOR FOR A RAILWAY VEHICLE AXLE

[75] Inventors: Jean-Louis Maupu; Hugues Chollet; Pierre Caroff, all of Arcueil; Denis Duhot, Paris, all of France

[73] Assignees: Alshtom, Paris; Institut National de Recherche sur les Transports et Leur Securite, Arcueil, both of France

[21] Appl. No.: 339,761

[22] Filed: Apr. 18, 1989

[30] Foreign Application Priority Data

Apr. 18, 1988 [FR] France ............................. 88 05078

[51] Int. Cl.$^5$ .......................... G01B 7/14; H01L 43/06
[52] U.S. Cl. ............................. 324/207.2; 324/207.12; 324/207.22; 324/207.26; 324/235; 104/284; 307/309; 338/32 H
[58] Field of Search ............... 324/207, 208, 235, 251; 307/309; 338/32 R; 104/284

[56] References Cited

U.S. PATENT DOCUMENTS 3,849,724 11/1974 Ghibu et al. .................... 324/207

OTHER PUBLICATIONS

ETZ—A vo. 83, No. 11, 21 Mai 1962—pp. 367–372, CH. J. LIPPMANN (cited in the specfication).

Primary Examiner—Reinhard J. Eisenzopf
Assistant Examiner—Walter E. Snow
Attorney, Agent, or Firm—Sughrue, Mion, Zinn, Macpeak & Seas

[57] ABSTRACT

A position sensor for measuring the separation, in a givne direction (Oy), between a first part such as a datum element of a railway vehicle axle and a fixed second part such as a rail on which said axles runs, includes magnets (11, 12) for producing a magnetic field above the second part (10) and Hall effect probes (15) for measuring the value of the component of the field in said given direction (Oy) with variation in that value being proportional to the separation.

5 Claims, 6 Drawing Sheets

HALL EFFECT POSITION SENSOR FOR A RAILWAY VEHICLE AXLE

FIELD OF THE INVENTION

The present invention relates to a position sensor, in particular a sensor for detecting the position of a railway vehicle axle with respect to a rail of the railway track.

BACKGROUND OF THE INVENTION

Proposals have been made to detect the approach of a metal first part relative to a fixed second part, by observing the distortion of a magnetic field associated with the second part as the metal part approaches.

Advantageously, such detection may be performed by means of a Hall effect probe.

On this subject, reference may usefully be made to document ETZ-A, vol. 83, no. 11, May 21, 1962 pages 367–372. (Ch.J. Lippmann).

Such a method cannot immediately be applied to detecting the position of a vehicle axle with respect to a rail, since if the probe is connected to the axle, its height is not constant with respect to the rail due to the movements of the vehicle.

It is an object of the present invention to provide a sensor whose measurement signal is independent of the height at which the probe is located.

It is a further object of the invention to provide a sensor whose measurement signal is unaffected by the return current which flows in the railway track.

SUMMARY OF THE INVENTION

The invention provides a position sensor for measuring the separation, in a given direction, between a first part such as a datum element of a railway vehicle axle and a fixed second part such as a rail on which said axle runs, said sensor including first means for producing a magnetic field above said second part, the lines of force of the field being vertical and perpendicular to said direction, and second means for measuring the value of the component of said magnetic field in said direction, variation in that value being proportional to said separation, said sensor being characterized in that said second means comprise two Hall effect probes secured to said first part with their planes perpendicular to said direction, and arranged at a fixed distance from each other and at the same height relative to said second part, and carrying identical control currents, said second means also including a circuit producing a signal:

$$S1 = (V1 + V2)/(V1 - V2)$$

where V1 and V2 are the respective Hall voltages of said two probes, said signal S1 being proportional to said separation.

BRIEF DESCRIPTION OF THE DRAWINGS

A preferred embodiment of the invention is described with reference to the accompanying drawings in which.

DESCRIPTION OF THE PREFERRED EMBODIMENTS

The invention is based on observing the distortions suffered by a uniform magnetic field applied in a direction Oz perpendicular to the plane of the railway track, these distortions being observed in a direction Oy parallel to the plane of the track and perpendicular to the track, and being produced by the presence of the rail.

If, for example, the lines of force of a magnetic field created by a solenoid of axis Oz are observed (FIG. 1), it is found that they take the form of straight lines parallel to Oz, except in the vicinity of the walls of the solenoid at abscissae $+a$ and $-a$.

Figure 1:
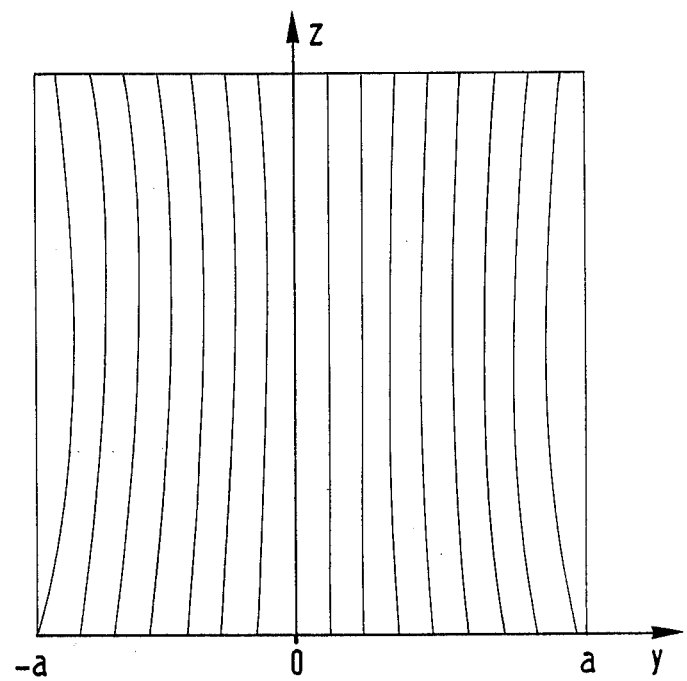
FIG. 1 is a graph showing the lines of force of a magnetic field produced by a solenoid.
Figure 2:
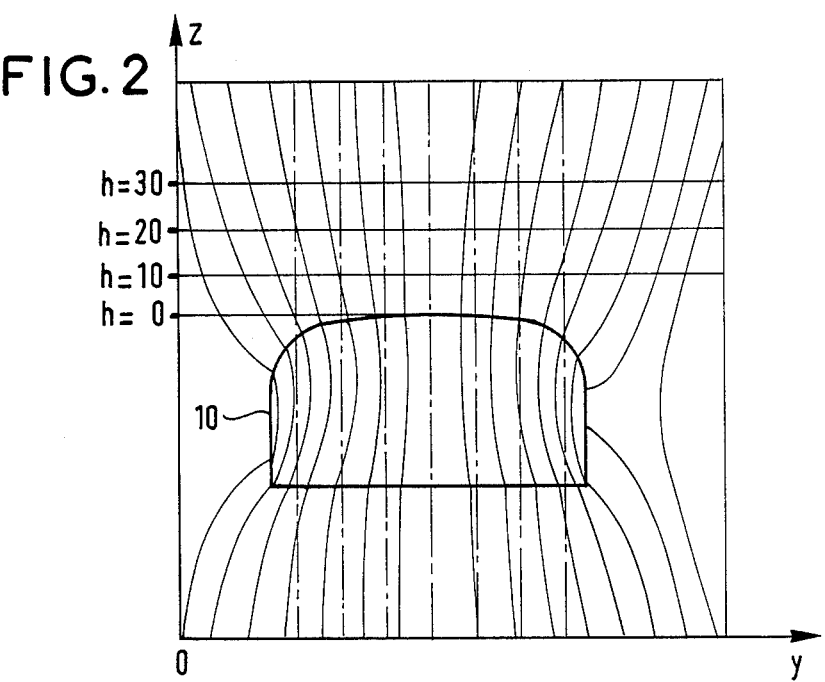
FIG. 2 is a graph showing the same field in the presence of the metal mass constituted by a railway line.

If direction Oz is perpendicular to the plane of a railway track and lies in the vertical plane of symmetry of a rail, it is found that the presence of the metal mass constituted by a rail 10 in the magnetic field of FIG. 1 causes distortion of the lines of force; this is shown in FIG. 2.

Figure 3:
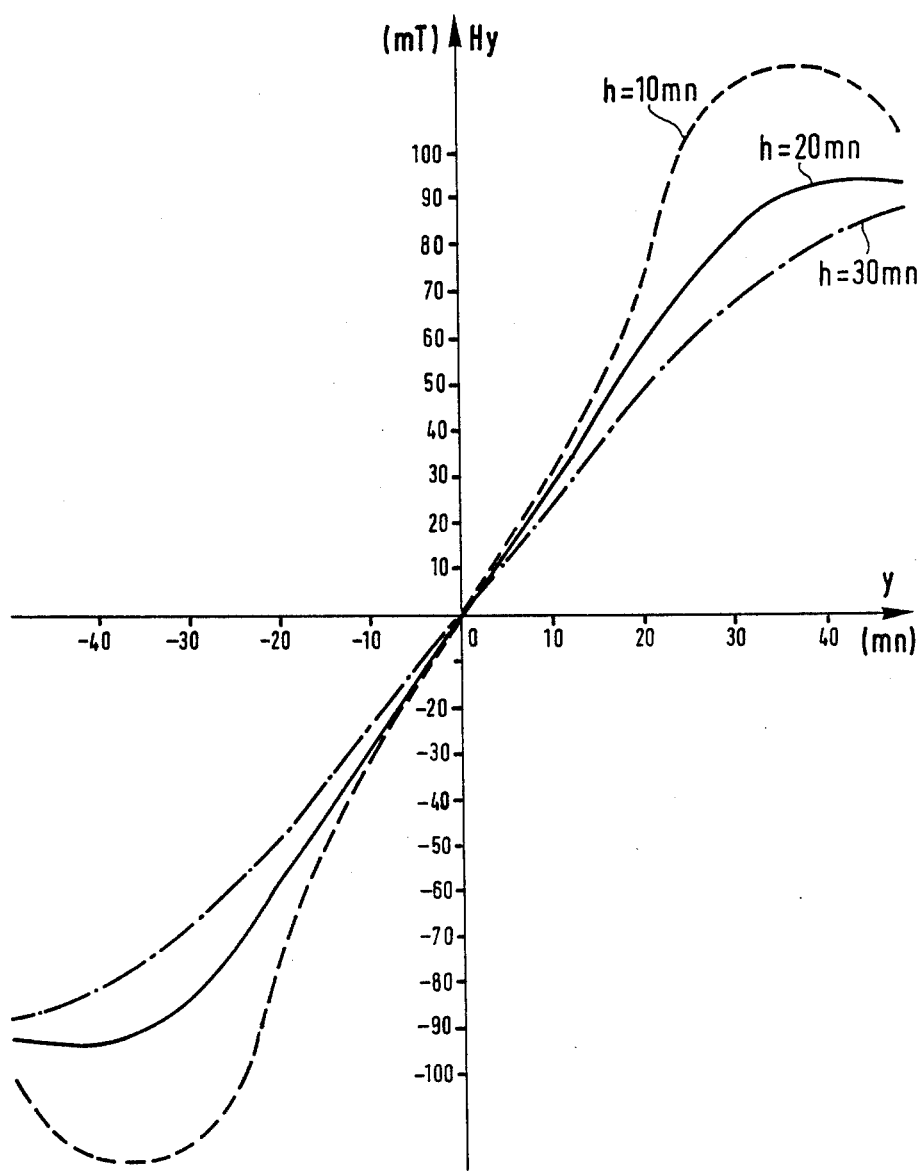
FIG. 3 is a graph of the component of the field of FIG. 2 in a direction perpendicular to the rail.

With reference to the graph (FIG. 3) of the variation in the magnetic field component Hy along Oy as a function of the distance from the plane of symmetry of the rail, it is found that at a given height h above the rail, the variations in the field component Hy are linear over a distance of a distance of several centimeters. In FIG. 3, curves of Hy(y) have been drawn for h = 10 mm, 20 mm and 30 mm and linearity is observed over a distance in the Oy direction lying in the range $-30$ mm to $+30$ mm.

In that range, it is therefore possible to write $Hy = k \cdot y$ where k is a factor which depends, among other things, on height above to the upper surface of the rail.

It is also seen that there points adjacent to the magnets where the variation in the Hx component of the field is a linear function of the displacement of the magnets with respect to the rail along Ox.

The invention is founded on the basis of these considerations. The sensor of the invention includes means for producing a magnetic field substantially perpendicular to the plane of the track in the absence of a rail, and means for measuring the variations in its component along one direction at a given height above the rail. The measuring means includes a Hall effect probe.

When measuring the position of a railway vehicle axle, it is impossible to permanently maintain a probe at a well-defined height h above the rail, because the axle is subjected to vertical displacements relative to the rail. In order to obtain a measurement which is independent of height, two Hall effect probes are used which are constrained to remain at the same horizontal distance d from each other and which in the absence of movement of the axle are located at the same height above the rail.

If at a given instant the first probe is located at an abscissa a, it measures a field H1=ka.

The second probe measures H2=k(a−d).

If a circuit produces a signal:

$$S = \frac{H1 + H2}{H1 - H2} = \frac{k(2a - d)}{kd} = \frac{2a - d}{d}$$

it can be seen that this signal is independent of k and therefore of height. In accordance with one characteristic of the invention, the sensor of the invention therefore advantageously includes two probes located at a fixed horizontal distance from each other and at the same height above the rail and includes a circuit which generates the ratio between the sum and the difference of the signals emitted by the probes.

Figure 4:
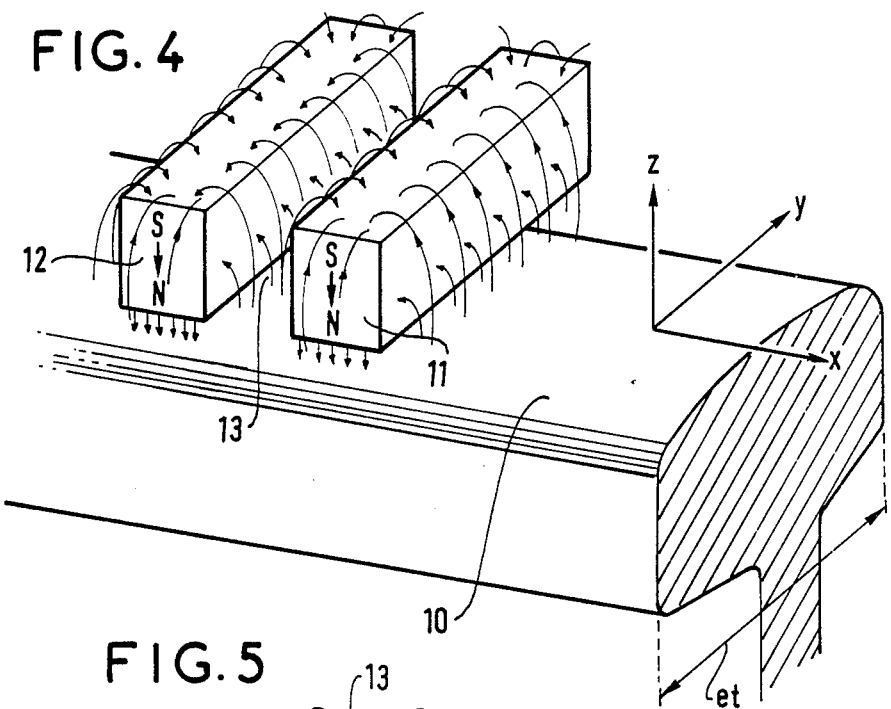
FIG. 4 is a perspective view of a rail which is provided with magnets to produce a field perpendicular to the rail.
Figure 5:
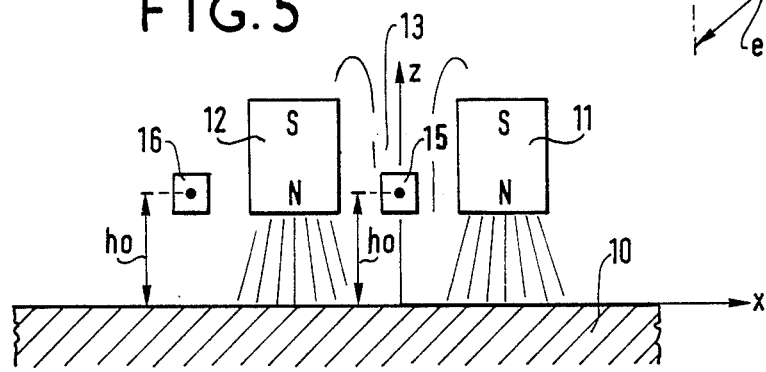
FIGS. 5, 6 and 7 are diagrammatic elevation, end and top views respectively showing the arrangement of the magnets and of the sensor probes with respect to the rail.
Figure 6:
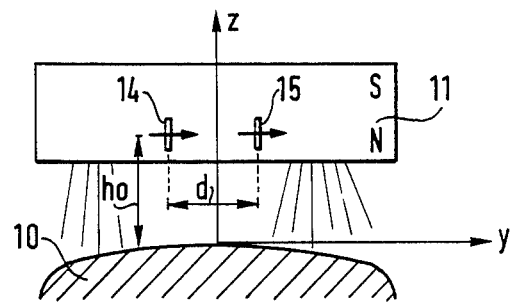
Figure 7:
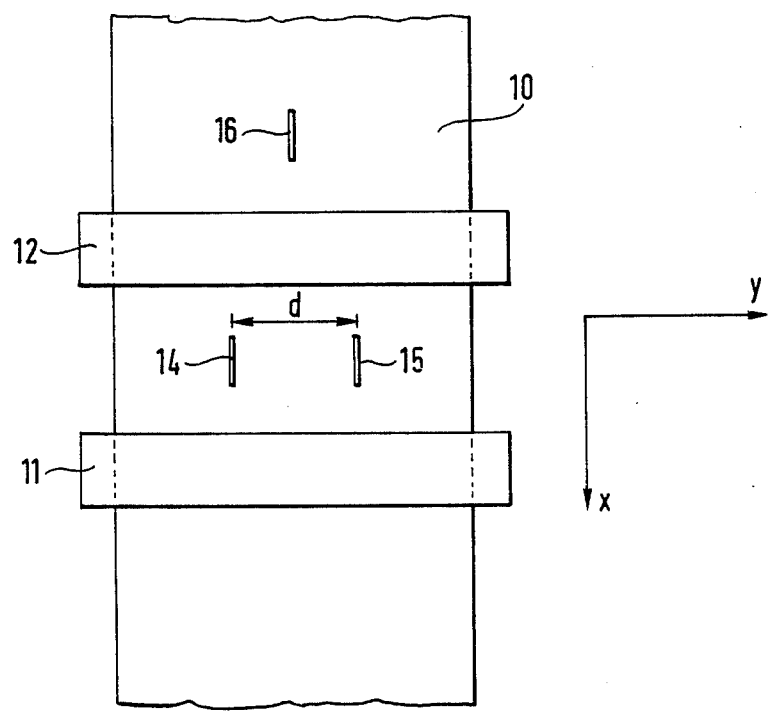

FIG. 4 shows a rail 10 having an axis Ox. The axis Oz is directed vertically upwards. The axis Oy is a transverse axis perpendicular to both Oz and Ox.

In a first embodiment, the magnetic field is produced by two parallel bar magnets 11 and 12, arranged lengthwise along the axis Oy and which are magnetized NS along axis Oz, in such a way that the field is uniform and vertical in the gap 13 between the magnets.

In order to measure the variations in the horizontal component of the field, two Hall effect probes are located in the gap 13, their planes being parallel to the plane zOx. They are situated at a distance ho above the rail and separated by a distance d.

If V1 and V2 are the Hall voltages obtained when the probes are injected with a given control current, it has been observed that the measurement of the magnetic field component along Oy, and hence the desired position deviation, is obtained without being influenced by the height of the probes above the rails, by producing a signal:

$$S1 = \frac{V1 + V2}{V1 - V2}$$

In general, the rail is used as a traction current return path for railway vehicles; it therefore generates an interference signal in probes 13 and 14.

This drawback is eliminated by providing the sensor with a third Hall effect probe 16 at a location remote from the influence of the magnets 11 and 12, and at the same height ho above the rail as probes 14 and 15.

If V3 is the signal detected by probe 16, the electronic circuit of the sensor of this invention produces a correction signal S3 where:

$$S3 = \frac{V1 + V2 - 2V3}{V1 - V2}$$

It should be noted that in applications which use only a single probe subjected to the magnetic field, (for example, where the height of the probe will not vary) one could use a compensation probe providing a signal Vc and produce a signal:

$$S2 = V1 - Vc$$

proportional to the desired component.

Figure 8:
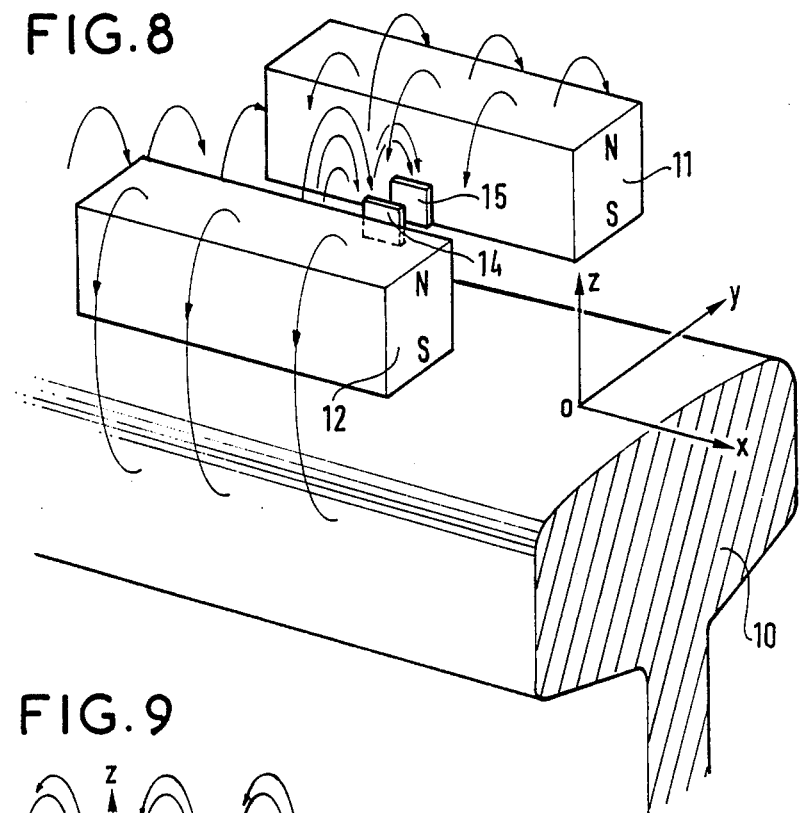
FIG. 8 is a perspective view of a rail with a different arrangement of magnets.
Figure 9:
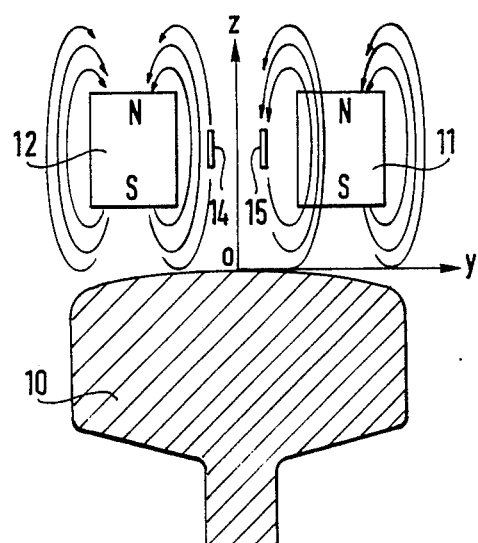
FIG. 9 is a perpendicular section through the rail of the assembly of FIG. 8.
Figure 10:
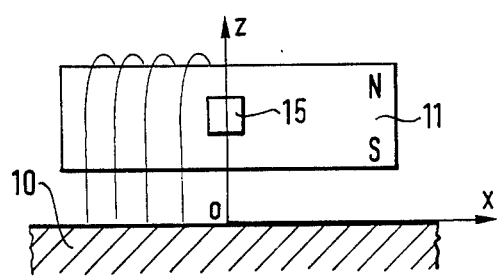
FIG. 10 shows the same assembly in elevation.

FIGS. 8 to 10 illustrate a different arrangement of the magnets relative to the rail. Elements common to FIGS. 4 to 7 are given the same reference numerals.

In this case, the magnets 11 and 12 are bar magnets whose longest dimensions are parallel to rail 10 (direction Ox); they are magnetized NS in the vertical direction Oz. Hall effect probes 14 and 15 have their planes parallel to the vertical plane parallel to the rail (plane zOx).

For a multiplicity of well known reasons, it is preferable to operate the Hall effect probes under null field conditions.

Figure 11:
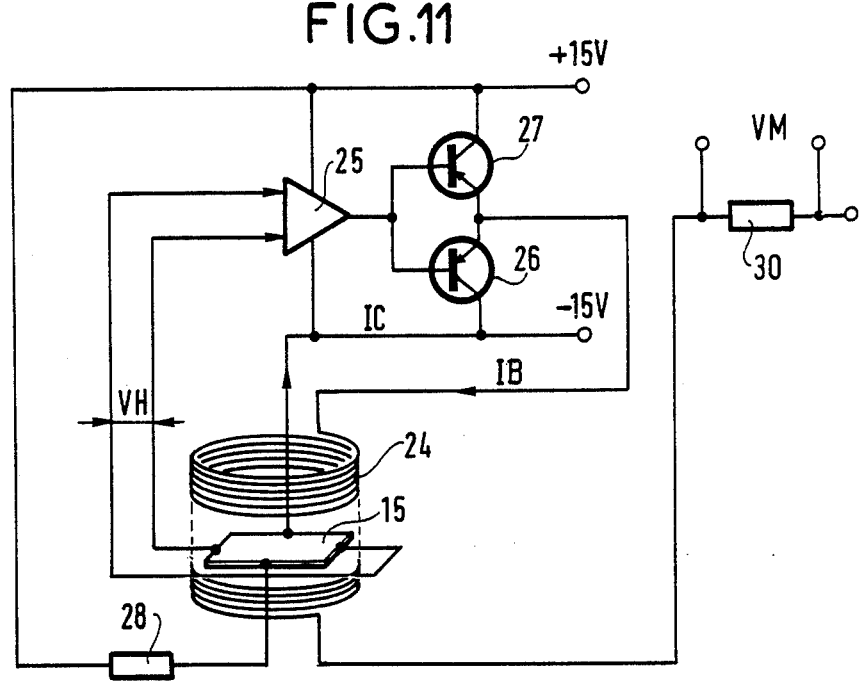
FIG. 11 is an electronic circuit diagram of the "null-field" system of the Hall effect probes used in the sensor according to the invention.

For this reason, the Hall effect probes 14, 15, and 16 are associated with an electronic circuit such as that described with reference to FIG. 11.

Probe 15, for example, is located inside a coil 25 which creates a field parallel and in the opposite direction to the measured field Hy.

This coil is fed with a current IB produced from the Hall voltage VH of the probe 15, voltage VH being applied to the input of an operational amplifier 25 followed by a transistor stage 26, 27.

The coil field therefore continually balances the measured field and cancels out the Hall voltage.

The control current Ic passing through the Hall effect probe is produced by a circuit comprising a DC source, for example −15V, +15V and a variable resistance 28. The source powers the amplifier and the transistors.

The desired signal proportional to the current IB in coil 24 is measured in the form of a voltage VM across the terminals of a resistance 30.

Figure 12:
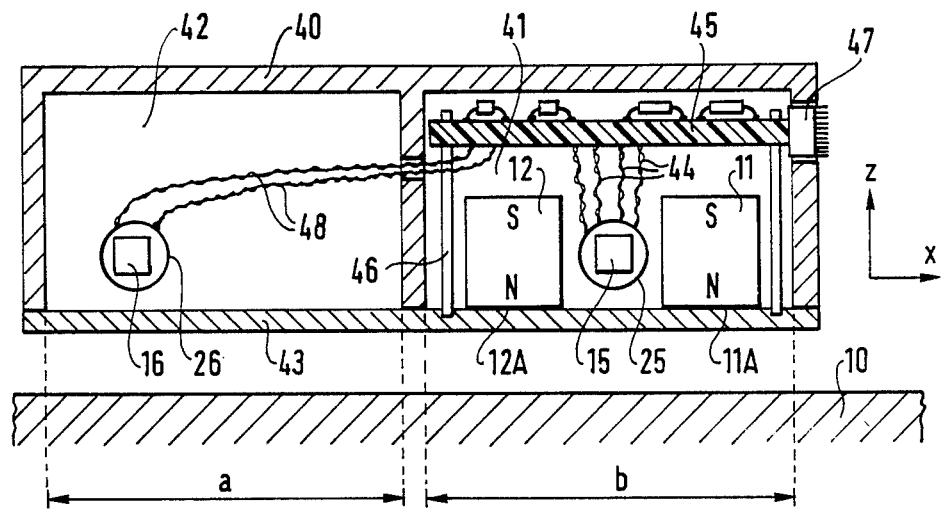
FIG. 12 is a sectional elevation view of a sensor according to one element.

FIG. 12 shows a section through a sensor according to a particularly compact embodiment of the invention.

It comprises a housing 40 of magnetic material such as iron, divided into two compartments 41 and 42. The bottom of the housing is closed by a plate 43 of non-magnetic material such as stainless steel.

Magnets 11 and 12 are placed in compartment 41, preferably secured to the plate 43 by adhesive layers 11a and 12a respectively.

Compartment 41 also contains the two probes 14 and 15 and their associated coils.

Only probe 15 and its coil 25 are visible in FIG. 12.

The probes and the coils are connected by leads such as 44 to an electronic circuit located on a printed circuit board 45 secured to the plate 43 by pillars such as 46. An output connector 47 allows information and signals to be transmitted to an external utilization circuit.

Compartment 42 encloses compensation probe 16 and its associated coil 26, which are connected by leads 48 to the electronic circuit.

Advantageously, the probes and the coils are maintained in fixed positions by filling compartments 41 and 42 with a hardsetting insulating resin.

We claim:

1. A position sensor for measuring the separation, in a given direction, between a movable first part such as a datum element of a railway vehicle axle and a fixed second part such as a rail on which said axle runs, said sensor including first means for producing a magnetic field above second part having lines of the field substantially perpendicular to said direction when said separation is zero and penetrating said second part, said sensor being characterized in that it includes two Hall effect probes (14, 15) secured to said first part proximate to said magnetic field producing means with their planes perpendicular to said direction (Oy) at a fixed distance (d) from each other an at the same height (ho) with respect to said second part, and carrying identical control currents, said sensor also including a circuit producing a signal $$S1 = (V1 + V2)/(V1 - V2)$$

where V1 and V2 are the respective Hall voltages of said probes, said signal S1 being proportional to said separation.

2. A position sensor for measuring the separation, in a given direction, of a movable first part such as a datum element of a railway vehicle axle and a fixed second part such as a rail on which said axle runs, said sensor including first means for producing a magnetic field above said second part having lines of said field substantially perpendicular to said direction when said separation is zero and penetrating said second part, said sensor being characterized in that it includes first and second Hall effect probes (14, 15) secured to the first part proximate to said magnetic field producing means with their planes perpendicular to said direction (Oy) at a fixed distance (d) from each other and at the same height (ho) with respect to said second part, and carrying identical control currents, and a third Hall effect probe (16) secured to said first part and placed outside the influence of said magnetic field, said third probe being at the same height relative to the second part as the other probes and having its place perpendicular to said direction (Oy), and carrying a control current of the same value as the control currents supplied to the other probes, said sensor also including a circuit producing a signal:

$$S3 = (V1 + V2 - 2V3)/(V1 - V2)$$

where V1, V2 and V3 are the Hall voltages of the first, second and third probes respectively, signal S3 being proportional to said separation.

3. A position sensor according to claim 1 or 2, characterized in that said first means comprise two magnets (11, 12), arranged parallel to each other and having a common direction of magnetization which is perpendicular to said direction (Oy).

4. A sensor according to claim 1, characterized in that each of said probes (14, 15, 16) is provided with a circuit which allows said probe to operate at null field.

5. A sensor according to claim 4, characterized in that said circuit includes for each of said probes (15) a coil (25) surrounding said probe, the axis of said coil being perpendicular IN proportional to the Hall voltage VH of said probe, the direction of said current being such that the field produced by it opposes the field measured by said probe, the value of the Hall voltage being obtained by measurement of the current in said coil.

* * * * *